United States Patent
Pitis (10) Patent No.: US 8,180,856 B2
(45) Date of Patent: May 15, 2012

(54) TESTING A NETWORK

(75) Inventor: Andrei Pitis, Bucharest (RO)

(73) Assignee: IXIA, Calabasas, CA (US)

( * ) Notice: Subject to any disclaimer, the term of this patent is extended or adjusted under 35 U.S.C. 154(b) by 909 days.

(21) Appl. No.: 11/532,035

(22) Filed: Sep. 14, 2006

(65) Prior Publication Data

US 2008/0123550 A1    May 29, 2008

(51) Int. Cl.
*G06F 15/16* (2006.01)
*G06F 3/00* (2006.01)

(52) U.S. Cl. ........................... 709/219; 719/321

(58) Field of Classification Search ............ 709/227
See application file for complete search history.

(56) References Cited

U.S. PATENT DOCUMENTS

| | | | |
|---|---|---|---|
| 4,792,753 A * | 12/1988 | Iwai ........................ 370/244 |
| 5,343,463 A | 8/1994 | van Tetering et al. |
| 5,477,531 A | 12/1995 | McKee |
| 5,568,471 A | 10/1996 | Hershey et al. |
| 5,583,792 A | 12/1996 | Li |
| 5,600,632 A | 2/1997 | Schulman |
| 5,657,438 A | 8/1997 | Wygodny |
| 5,671,351 A | 9/1997 | Wild |
| 5,787,147 A | 7/1998 | Gunderson |
| 5,787,253 A | 7/1998 | McCreery et al. |
| 5,867,710 A * | 2/1999 | Dorris et al. ............. 717/124 |
| 5,878,032 A | 3/1999 | Mirek et al. |
| 6,028,847 A | 2/2000 | Beanland |
| 6,088,777 A | 7/2000 | Sorber |
| 6,091,802 A | 7/2000 | Smith et al. |
| 6,108,800 A | 8/2000 | Asawa |
| 6,122,670 A | 9/2000 | Bennett et al. |
| 6,172,989 B1 | 1/2001 | Yanagihara et al. |
| 6,189,031 B1 | 2/2001 | Badger |
| 6,233,256 B1 | 5/2001 | Dieterich et al. |
| 6,321,264 B1 | 11/2001 | Fletcher |
| 6,345,302 B1 | 2/2002 | Bennett et al. |
| 6,360,332 B1 | 3/2002 | Weinberg |
| 6,446,121 B1 | 9/2002 | Shah |
| 6,477,483 B1 | 11/2002 | Scarlat |
| 6,483,840 B1 | 11/2002 | Vogel |
| 6,526,259 B1 | 2/2003 | Ho |
| 6,601,020 B1 | 7/2003 | Myers |
| 6,601,098 B1 | 7/2003 | Case et al. |
| 6,678,246 B1 | 1/2004 | Smyth |
| 6,721,274 B2 | 4/2004 | Hale et al. |
| 6,789,100 B2 | 9/2004 | Nemirovsky |
| 6,950,405 B2 | 9/2005 | Van Gerrevink |
| 2002/0037008 A1 | 3/2002 | Tagami |
| 2002/0080781 A1 | 6/2002 | Gustavsson |
| 2002/0138226 A1 | 9/2002 | Doane |
| 2002/0172205 A1 | 11/2002 | Tagore-Brage et al. |
| 2002/0177977 A1 | 11/2002 | Scarlet |
| 2003/0009544 A1 | 1/2003 | Wach |
| 2003/0231741 A1 | 12/2003 | Rancu et al. |
| 2004/0010612 A1 | 1/2004 | Pandya |
| 2004/0030757 A1 | 2/2004 | Pandya |

OTHER PUBLICATIONS

World Wide Web Consortium (W3C) website, www.w3.org/Protocols/HTTP/AsImplemented.html, 1998, p. 1.*

(Continued)

*Primary Examiner* — Ian N Moore
*Assistant Examiner* — Afshawn Towfighi
(74) *Attorney, Agent, or Firm* — SoCal IP Law Group LLP; Steven C. Sereboff; John E. Gunther (57) ABSTRACT

There are disclosed processes and systems relating to optimized traffic generation and reception for testing a network. A TCP/IP protocol stack and an HTTP program are operative in kernel space. The HTTP program may receive a test request from an application operative in user space. The HTTP program is adapted to fulfill the test request. The test request may be fulfilled without receipt of further instructions or data from the application program.

24 Claims, 3 Drawing Sheets

OTHER PUBLICATIONS

World Wide Web Consortium (W3C) website, www.w3.org/People/Berners-Lee/FAQ.html, 1999, p. 8.*

Zec, M. et al. "Real time IP network simulation at gigabit data rates", Proceedings of the 7th Int'l Conf. on Telecommunications, Jun. 2003.

Zec, Marko, "BSD Network stack virtualization", BSDCon Europe, Nov. 2002.

Bar, Moshe, "kHTTPd, a Kernel-based web server" Linux Journal, http://www.linuxjournal.com/article/4132, Aug. 2000.

* cited by examiner

TESTING A NETWORK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

The present invention relates to optimized traffic generation and reception for testing a communications network.

2. Description of the Related Art

In a packet switched network, a message to be sent is divided into packets of fixed or variable length. The packets are then sent individually over the network through multiple switches or nodes and then reassembled at a final destination before being delivered to a target device or end user. At the receiving end, the packets are then reassembled and the message is passed to the end user in a format compatible with the user's equipment.

Most packet switched networks operate according to a set of established protocols, implemented in a collection of interfaced layers known as a protocol stack. These layers may be defined according to the Open Systems Interconnect (OSI) model, having seven layers (from top to bottom): application, presentation, session, transport, network, data-link and physical. In general practice, though, the application layer is not considered part of the protocol stack, but instead is considered to lie on top of the protocol stack.

All but the physical layer of a protocol stack are typically software, though the network and data-link layer may be firmware and/or hardware. Each layer of the protocol stack typically exists to perform a specific function, such as addressing, routing, framing and physical transmission of packets. When a packet is to be transmitted over a network from a source system to a destination system, the packet will pass in a logically downward direction through layers of the protocol stack on the source system, and in a logically upward direction through corresponding layers of the protocol stack on the destination system. Each layer passes the packet to the adjacent layer, either up or down the protocol stack depending on whether the packet has been received or is being transmitted.

Each layer of the protocol stack in the transmitting process may add a respective header to the packet, which provides information to the corresponding layer in a receiving process. Thus, as a packet passes down through the protocol stack on a transmitting system, the packet may gain an additional header at each layer. At the bottom of the stack, the transmitting process may then frame the packet and physically transmit it over the network toward its destination. When the packet reaches its destination, the packet will then pass up through the protocol stack of the destination system. Each layer of the protocol stack in the destination system may obtain useful information from its associated header and will strip its header from the packet before passing the packet up to the next layer for processing. Application programs typically receives a byte stream from top layer of the protocol stack, not individual packets. The byte stream may consist of data that consists of a partial packet or data that covers more than one packet. This is very convenient for the application but may impair performance.

A variety of standards are known for use in packet switched networks. One of these, the TCP/IP suite, is typically used to manage reliable transmission of packets throughout the Internet and other IP networks. Typical stacks containing TCP/IP consist of five layers: physical, link, network (IP), transport (TCP) and application. These elements correspond to layers 1, 2, 3, 4 and 7 of the OSI model respectively.

The transport layer of TCP/IP corresponds to layer 4 of the OSI model. The transport layer allows source and destination machines to carry on a reliable conversation with each other.

The IP layer in TCP/IP corresponds to the network layer of the OSI model. The IP layer provides addressing information to facilitate independent routing of packets within or between networks and also includes other control layers, such as an Internet Control Message Protocol (ICMP) layer and an Address Resolution Protocol (ARP) layer.

The link layer under TCP/IP corresponds to the data-link layer of the OSI model. The link layer includes network interface card drivers to connect the machine to the physical network, such as an Ethernet network.

A common application-layer protocol is Hypertext Transfer Protocol (HTTP) which is used to transfer information between clients and servers over the World Wide Web. The client may be a web browser or other end-user tool. HTTP is a request/response protocol. The client or user agent initiates communications by establishing a TCP connection to the destination or source server. The connection may pass through intermediaries such as proxies, gateways, and tunnels. Once the connection is established, the source server waits to receive a request message from the user agent, and then returns a response message. A generic HTTP request message includes a request line containing the request, the Uniform Resource Identifier (i.e. the address), and the version of the HTTP protocol being employed. One or more header lines may follow the request line. The message concludes with a blank line and, optionally, a message body or payload. A generic HTTP response message includes a status line and, optionally, a message body or payload. Typically, an HTTP communication session will be comprised of the exchange of several messages to establish the session and to make and acknowledge a request and the exchange of several more messages to close the connection after the request has been satisfied.

In general, the machines that implement the HTTP/TCP/IP protocol stack are computers. Each of these computers includes one or more processors, memories, and input/output ports, and is managed by an operating system.

The computer memory may include a user space and a kernel space. The kernel space is an area of memory which is strictly reserved for running the kernel, device drivers and any kernel extensions. The TCP/IP protocol stack typically resides in kernel space, and the HTTP protocol typically resides in user space. Though some portions of the kernel space may be swapped (paged) out to the disk, some portions are typically never swappable. The user space is a memory area used by all applications and this memory can typically be swapped out at any time depending upon the current system requirements. The user space and the kernel space are distinct. An application program usually cannot access the kernel space directly. Application programs may, however, use the kernel to access system resources and hardware through system calls, and are therefore thought of as running above, or on top of, the kernel.

Typically, when an incoming packet enters a computer or other hardware device running a protocol stack, the destination of the packet may be some specific code within the kernel, or it may be an application program. In any event, the packet will typically be processed by multiple layers of the protocol stack and finally arrive at its destination. Similarly, an outgoing packet will typically be processed by multiple layers of the protocol stack before being transmitted onto the network.

When data (e.g., a byte stream) passes between the application layer and the TCP/IP protocol stack's transport layer, the data moves between user space and kernel space. Since user space and kernel space are separate areas of memory, however, the process of moving data includes copying the data to the destination area. This may also include deleting the original, either right away or in a housekeeping operation. Thus, in practice, once an outgoing payload has been processed by the application program in user space, it is copied to kernel space to be processed by the protocol stack. Similarly, once an incoming packet reaches the top of the TCP/IP protocol stack, its payload is copied to user space to be processed by the application. The request-response nature of the HTTP protocol requires significant time-consuming bidirectional data movement between the application layer and the TCP/IP protocol stack.

DETAILED DESCRIPTION

Throughout this description, the embodiments and examples shown should be considered as exemplars, rather than limitations on the apparatus and methods of the present invention.

Description of Systems

As explained above, protocol stacks are commonly used in general purpose computers and other computer devices and systems. Protocol stacks are also used in network testing systems.

Figure 1:
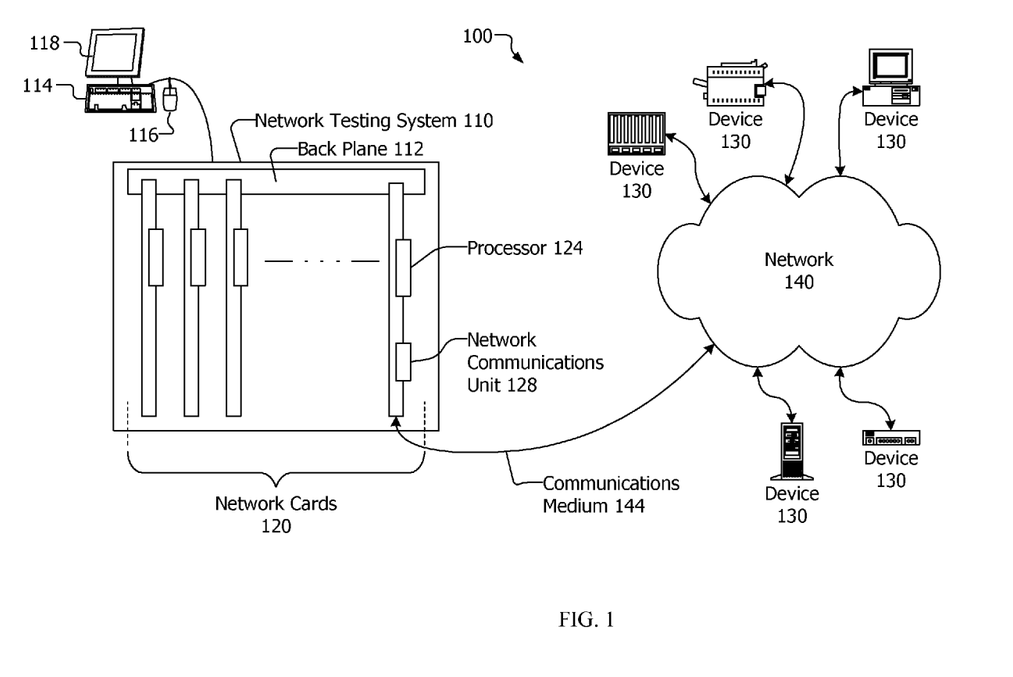
FIG. 1 is a diagram of an environment in which a protocol stack may be implemented.

Referring now to FIG. 1 there is shown a block diagram of an environment 100 in which a protocol stack may be implemented. The environment includes network testing system 110 coupled via a network card 120 to a network 140 over a communications medium 144. The network testing system 110 may include or be one or more of a performance analyzer, a conformance validation system, a network analyzer, a data unit blaster, a network management system, a combination of these, and/or others. The network testing system may be used to evaluate and/or measure characteristics and performance of a communication line or system, including the throughput of network traffic, the number of dropped data units, jitter, and many others. The network testing system may be used to evaluate the performance of servers, networking devices such as, for example, routers, gateways, load sharers, and others, as well as network application programs and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a backplane 112. The network cards 120 may be coupled with the backplane 112. One or more network cards 120 may be included in the network testing system 110. The network cards 120 may be permanently installed in the network testing system 110, may be removable, or may be a combination thereof.

The network testing system 110 and/or one or more of the network cards 120 may include an operating system such as, for example, versions of MS DOS, Microsoft Windows, Mac OS, Palm OS, Symbian OS, Unix or Linux.

Network card 120 is coupled with network 140 via a communications medium 144. Although only one connection over communications medium 144 is shown, each of the network cards 120 may be connected with network 140 over a communications medium. The communications medium may be, for example, wire lines such as an Ethernet cable, fiber optic cable, and coaxial cable, and may be wireless.

The network testing system 110 and the network cards 120 may support one or more well known higher level communications standards or protocols including the Hypertext Transfer Protocol (HTTP); may support one or more well known lower level communications standards or protocols such as, for example, the 10 and/or 100 Gigabit Ethernet standards, the Fibre Channel standards, one or more varieties of the IEEE 802 Ethernet standards, Sonet, CDMA, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®) and Bluetooth; may support proprietary protocols; and may support other protocols. Each network card 120 may support a single communications protocol, may support a number of related protocols, or may support a number or combination of unrelated protocols.

The term "network card" as used herein encompasses line cards, test cards, analysis cards, network line cards, load modules, interface cards, network interface cards, data interface cards, data unit engine cards, service cards, smart cards, switch cards, relay access cards, CPU cards, port cards, and others. The network cards 120 may be referred to as blades, particularly when a processor is included on the network card. The network cards 120 may include one or more processors 124 and one or more network communications units 128.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols in hardware. The network communications unit 128 may include a network interface through which the network card 120 may transmit and/or receive communications over the network 140.

The backplane 112 may serve as a bus or communications medium for the network cards 120. The backplane 112 may also provide power to the network cards 120.

The network testing system 110 may have a computer coupled thereto (not shown). The computer may be local to or remote from the network testing system 110. In another embodiment, the network testing system 110 may include a CPU on a card, motherboard or backplane that allows the chassis to also serve as a computer workstation. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or the backplane 112.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the devices 130 in the network 140. The network testing system 110 may be used to test and evaluate the network 140 and/or portions thereof, network capable devices 130, application programs running on network capable devices 130, and/or services provided by network 140 and/or network capable devices 130.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, may be data unit switched or circuit switched, and may be a combination of these. The network 140 may be comprised of a single or numerous nodes providing numerous physical and logical paths for data units to travel.

Communications on the network 140 may take various forms, including frames, cells, datagrams, data units, higher level logical groupings of data, or other units of information, all of which are referred to herein as data units. Those data units that are communicated over a network are referred to herein as network traffic. The network traffic may include data units that represent electronic mail messages, computer files, web pages, graphics, documents, audio and video files, streaming media such as music (audio) and video, telephone (voice) conversations, and others.

The network capable devices 130 may be devices capable of communicating over the network 140 and/or listening to, injecting, delaying, dropping, and/or modifying network traffic on network 140. The network capable devices 130 may be computing devices such as computer workstations, personal computers, servers, portable computers, set-top boxes, video game systems, personal video recorders, telephones, personal digital assistants (PDAs), computing tablets, and the like; peripheral devices such as printers, scanners, facsimile machines and the like; network capable storage devices including disk drives such as network attached storage (NAS) and storage area network (SAN) devices; testing equipment such as analyzing devices, network conformance systems, emulation systems, network monitoring devices, and network traffic generators; and networking devices such as routers, relays, firewalls, hubs, switches, bridges, traffic accelerators, and multiplexers. In addition, the network capable devices 130 may include appliances such as refrigerators, washing machines, and the like as well as residential or commercial heating, ventilation, and air conditioning (HVAC) systems, alarm systems, and other devices or systems capable of communicating over a network. One or more of the network capable devices 130 may be devices to be tested and may be referred to as devices under test.

The hardware and firmware components of the network testing system 110 may include various specialized units, circuits, software and interfaces for providing the functionality and features described here. The invention may be embodied in whole or in part in software which operates on a computer and take the form of firmware, an application program, an applet (e.g., a Java applet), a browser plug-in, a COM object, a dynamic linked library (DLL), a script, one or more subroutines, a device driver, or an operating system component or service. The hardware and software of the invention and its functions may be distributed.

Additional and fewer units, modules or other arrangement of software, hardware and data structures may be used to achieve the systems and devices described herein.

To communicate data units on the network 140, the network testing system 110 and other systems and devices may include a protocol stack. The network testing system 110 may have various types of applications programs, such as test applications. These test applications may reside in user space on the top of the protocol stack. Test applications have functions such as performance analysis, conformance validation, network analysis, packet blasting, and network management.

Figure 2:
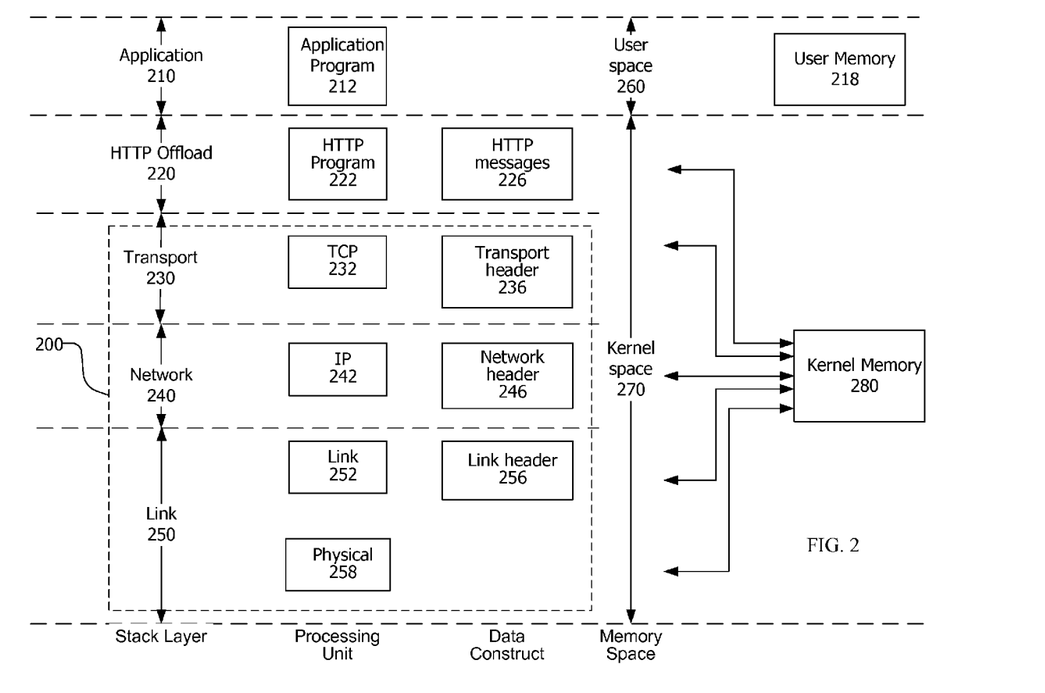
FIG. 2 is a diagram of a logical arrangement in a communications apparatus.

Referring now to FIG. 2 there is shown a diagram of a logical arrangement in a communications apparatus defined by a user space 260 and a kernel space 270. The communications apparatus is logically divided into five layers 210, 220, 230, 240, 250, which in FIG. 2 are demarcated by dashed lines. The application layer 210 is in user space 260. The other layers 220, 230, 240, 250 are in kernel space 270.

Within kernel space 270 there is a kernel memory 280 and a conventional TCP/IP protocol stack 200, comprising the transport layer 230, the network layer 240, and the link layer 250. Also within kernel space is an HTTP offload 220 which removes, or offloads, the HTTP protocol and other functions from user space 260 and places them in the kernel space 270. The HTTP offload 220 may be interposed as an HTTP protocol layer between the application layer 210 and the transport layer 230, as shown in FIG. 2. The HTTP offload 220 may also be disposed within the kernel space along side, or at the same logical level as, the transport layer 230. In the later case, the transport layer 230 and the application layer 210 may exchange data directly.

By running the HTTP offload 220 and the TCP/IP protocol stack 200 in the kernel space 270, several benefits may be obtained. These benefits include increased speed, improved memory utilization, lower memory requirements, and reduced processing requirements. In particular, the HTTP offload 220 and the TCP/IP protocol stack 200 can exchange data within kernel space and can share the kernel memory 250. The protocol stack 200 and HTTP offload 220 may use the kernel memory 280 for accessing, managing and operating on data units. The interface between the HTTP offload 220 and the TCP/IP protocol stack 200 may not be the standard TCP/IP Application Program Interface (API). The HTTP offload 200 and the TCP/IP protocol stack 200 may be tightly coupled such that data units may be exchanged faster, or with lower latency, than through the standard TCP/IP API.

Within the application layer 210, there is an application program 212 and application data 216. The application program 212 may be a test manager, test executive, or other application. The application data 216 generated by the application program 212 may be a test request for conducting a test session. A test session may require the formation and transmission of at least one HTTP message. In practice, a test session may require the transmission and reception of a large plurality of HTTP test messages. The test request may include payload data for HTTP messages to be transmitted during the test session, or may include a pointer to stored payload data located either in memory or on a computer readable storage medium. A test request may also include descriptors of payload data for HTTP messages where the payload data will be generated in the HTTP offload 220.

Within the HTTP offload 220, there is an HTTP program 222 that forms HTTP messages for transmission and interprets received HTTP messages. The data constructs 226 may be both transmitted and received HTTP messages. The HTTP program 222 may receive a test request from the application program 212. The HTTP program 222 may fulfill the test request by forming and transmitting, via the protocol stack 200, at least one HTTP message. The test request may require the interleaved transmission and reception of a large plurality of HTTP messages. The test request may be fulfilled without receipt of further instructions or data from the application layer. The HTTP program 222 may form message payloads based on descriptors received from the application program 212, or may receive the payload data or a pointer to stored payload data from the application.

The HTTP program 222 may be implemented by software instructions running on a processor. The software instructions may be stored on a computer readable storage medium.

The TCP/IP protocol stack 200 has the three layers described above: transport 230, network 240 and link 250. The protocol stack 200 and the HTTP offload 220 run entirely in kernel space 270. For each layer 230, 240, 250 of the TCP/IP protocol stack 200 there may be a corresponding processing unit 232, 242, 252, memory constructs and data constructs 236, 246, 256. The processing units may be implemented at least in part by software instructions executed by a common or separate processor. The software instructions may be stored on a computer readable storage medium.

Within the transport layer 230, there is a transport unit 232 and a transport header 236. The transport unit 232 forms transport headers for transmission and interprets received transport headers. In TCP, the transport header includes a checksum.

Within the network layer 240, there is a network unit 242 and a network header 246. In a TCP/IP protocol stack, the network protocol is IP. The network unit 242 forms network headers. In IP, the network header 246 includes a checksum.

The link layer 250 may be viewed as having a MAC layer 252 and a device layer 258 as separate layers or sub-layers. Within the link layer 250, there is a media access control (MAC) unit 252, and a MAC header 256. The link layer may also include a transmit queue and a receive queue that are not shown in FIG. 2. The MAC unit 242 forms MAC headers for transmission and interprets received MAC headers. The MAC header may be an Ethernet header, though other protocols may be used, such as ATM and Sonet. The device 258 frames and transmits data units, and receives and de-frames data units. The device 258 may be or have hardware for assembling data units.

Description of Methods

Figure 3:
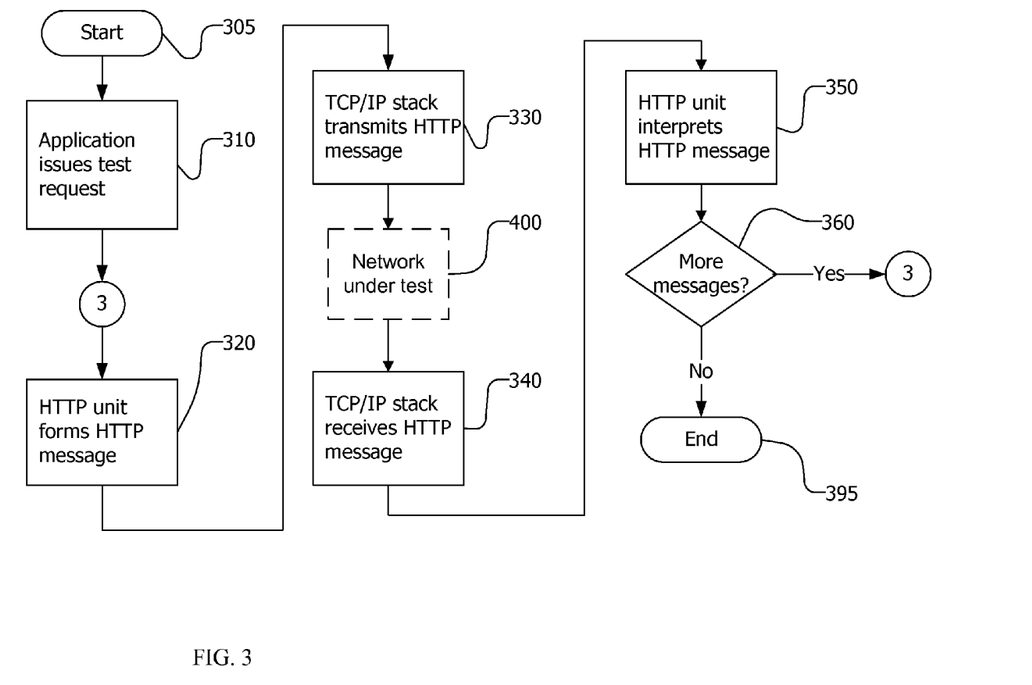
FIG. 3 is a flow chart of a process of operating a protocol stack in a device to transmit data.

Referring now to FIG. 3 there is shown a simplified exemplary flow chart of a process of operating a protocol stack to transmit data. FIG. 3 is described with respect to the network testing system of FIG. 1 and the protocol stack 200, HTTP program 222, and application program 212 of FIG. 2, but is compatible with others.

The flow chart has both a start 305 and an end 395, but the process is cyclical in nature. That is, when the application program 212 provides a test request at step 310, the process will continue until the test request is fulfilled (or the process is terminated prematurely). The flow chart of FIG. 2 illustrates the process for a single HTTP request/response message interchange. Note that not all HTTP messages require a response. The test request may require a plurality of message streams exchanged with a single destination address or with a plurality of destination addresses. The plurality of messages and the data units corresponding to the messages may be interspersed and interleaved, and response messages may not arrive in the order of the corresponding request messages. Thus the process of FIG. 3 may be concurrently applied to multiple message streams, each of which may be at a different step in the process.

The process is initiated when the application program 212 issues a test request at step 310. The test request will require the formation and transmission of at least one HTTP message. The test request may require the exchange of a large plurality for HTTP message sequences. Upon receipt of a test request, the HTTP program 222 forms an HTTP message at step 320.

The message is then passed through and processed by the TCP/IP stack at step 330. As previously discussed, the message is passed down through successive layers of the TCP/IP stack. Each layer may alter the message format and add data constructs appropriate to the TCP/IP protocols. At the bottom (physical) layer of the TCP/IP stack, the message has been converted into data units that are then transmitted over the network under test 400. The exact nature of these data units is dictated by the TCP/IP protocol and the transmission protocol of the network 400, and each HTTP message may be divided into a plurality of data units for transmission.

The network under test 400 may be comprised of a single device, such as a server or load balancer, at the far end of a network connection. The network under test may be comprised of a network of multiple devices such as routers, in which case the far end of the network may be connected to a second network card 120 in network testing system 110.

Given the request/response nature of the HTTP protocol, most messages transmitted at step 330 will result in a message being received at step 340. The received message may be divided into a plurality of data units, and these data units may not be received in proper sequence.

As previously discussed, the data units are passed up through successive layers of the TCP/IP stack. Each layer may alter the data unit format and may remove data constructs. At the top (TCP) layer of the TCP/IP stack, the data units will be reassembled into an HTTP message that is interpreted by the HTTP program 222 at step 350. The interpretation may include a determination if a response message is required.

At step 360, a decision is made if any additional HTTP messages need to be formed and transmitted, either in response to a received message, or as a requirement of the test request. The process terminates at 395 when the test request is fulfilled and no more messages are required.

The various steps of the process may include measurement and accumulation of performance statistics. Performance statistics may include the number of messages and data units transmitted and received, the number and types of errors, and temporal information such as average latency or response time. The performance statistics may be reported upon request from the application program 212, or may be reported to the application program 212 after the test request is fulfilled. For example, the process may accumulate data on the number of data units that had to be retransmitted due to errors.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For any means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computing device to test a communication network, the computing device comprising:
    a processor
    a memory coupled with the processor, the memory divided into a kernel space and a user space
    a hardware interface to the communication network
    a storage medium having instructions stored thereon which when executed cause the computing device to perform actions comprising:
        operating an application program within the user space
        operating a protocol stack within the kernel space, the protocol stack comprising a interfaced transport, network, and link layers in which data units are exchanged between and processed by adjacent layers
        operating an HTTP offload program within the kernel space, the HTTP offload program configured to receive a test request from the application program, the test request for conducting a test of the communication network, the HTTP offload program further configured to fulfill the test request by transmitting, receiving, and interpreting a plurality of HTTP messages via the protocol stack.

2. The computing device of claim 1, wherein the HTTP offload program and the protocol stack exchange data within the kernel space.

3. The computing device of claim 2, wherein the HTTP offload program and the protocol stack are tightly coupled.

4. The computing device of claim 1, the HTTP offload program further configured to fulfill the test request without receiving additional instructions or data from the application program.

5. The computing device of claim 4
    wherein the test request includes descriptors of payload data
    the HTTP offload program is further adapted to construct HTTP message payloads from such descriptors.

6. The computing device of claim 4
    wherein the test request includes payload data
    the HTTP offload program is further adapted to construct HTTP message payloads from the payload data.

7. The computing device of claim 4
    wherein the test request includes a pointer to stored payload data
    the HTTP offload program is further adapted to construct HTTP message payloads from the payload data.

8. The computing device of claim 4, the HTTP offload program further adapted to accumulate and report performance statistics.

9. The computing device of claim 1, included in a network testing apparatus.

10. A process for testing a communication network with a computing device including a processor coupled to a memory divided into a kernel space and a user space, the process comprising:
    operating a protocol stack in the kernel space, the protocol stack comprising interfaced transport, network, and link layers in which data units are exchanged between and processed by adjacent layers
    operating an HTTP offload program in the kernel space, the HTTP offload program receiving a test request from an application program operative in a user space, the test request for conducting a test of the communication network, and fulfilling the test request by transmitting, receiving, and interpreting a plurality of HTTP messages via the protocol stack.

11. The process for testing a network of claim 10, wherein fulfilling the test request further comprises:
    forming a first HTTP message within the HTTP offload program in accordance with the test request
    transmitting the first HTTP message via the TCP/IP protocol stack
    receiving via the TCP/IP protocol stack a second HTTP message in response to the first HTTP message
    interpreting the second HTTP message within the HTTP offload program.

12. The process for testing a network of claim 10
    wherein the test request includes descriptors of payload data
    fulfilling the test request includes constructing a payload of at least one HTTP message from the descriptors.

13. The process for testing a network of claim 10
    wherein the test request includes payload data
    fulfilling the test request includes constructing a payload of at least one HTTP message from the payload data.

14. The process for testing a network of claim 10
    wherein the test request includes a pointer to stored payload data
    fulfilling the test request includes constructing the payload of at least one HTTP message from the payload data.

15. The process for testing a network with a protocol stack of claim 10
    wherein the HTTP offload program and the protocol stack exchange data within the kernel space.

16. The process for testing a network with a protocol stack of claim 10
    wherein fulfilling the test request is completed without further interaction with the application program.

17. An apparatus for testing a communication network, comprising:
    a processor coupled to a memory divided into a kernel space and a user space
    a protocol stack disposed in the kernel space and comprising interfaced HTTP offload, transport, network, and link layers in which data units are exchanged between adjacent layers within the kernel space an application program disposed in the user space wherein the application program generates a test request for conducting a test of the communication network, and a plurality of HTTP messages are generated at the HTTP offload layer and transmitted via the transport, network, and link layers in response to the test request.

18. A non-transitory storage medium having instructions stored thereon which when executed by a processor will cause the processor to perform actions comprising:

operating an application program within a user space operating a protocol stack within a kernel space, the stack comprising interfaced transport, network, and link layers in which data units are exchanged between and processed by adjacent layers operating an HTTP offload program in the kernel space, the HTTP offload program receiving a test request from an application program operative in a user space, the test request for conducting a test of a communication network, and fulfilling the test request by transmitting, receiving, and interpreting a plurality of HTTP messages via the protocol stack.

19. The non-transitory storage medium of claim 18, wherein the HTTP offload program and the protocol stack exchange data within the kernel space.

20. The non-transitory storage medium of claim 19, fulfilling the test request further comprising:

forming a first HTTP message within the HTTP offload program in accordance with the test request transmitting the first HTTP message via the TCP/IP protocol stack receiving via the TCP/IP protocol stack a second HTTP message in response to the first HTTP message interpreting the second HTTP message within the HTTP offload program.

21. The non-transitory storage medium of claim 18, wherein the test request includes descriptors of payload data fulfilling the test request includes constructing a payload of at least one HTTP message from the descriptors.

22. The non-transitory storage medium of claim 18, wherein the test request includes payload data fulfilling the test request includes constructing a payload of at least one HTTP message from the payload data.

23. The non-transitory storage medium of claim 18, wherein the test request includes a pointer to stored payload data fulfilling the test request includes constructing the payload of at least one HTTP message from the payload data.

24. The non-transitory storage medium of claim 18, wherein wherein fulfilling the test request is completed without further interaction with the application program.

* * * * *